United States Patent
Zhang et al.

(10) Patent No.: US 8,964,915 B2
(45) Date of Patent: Feb. 24, 2015

(54) METHOD AND APPARATUS FOR IMPROVING COMMUNICATION RATE

(71) Applicant: Huawei Device Co., Ltd., Shenzhen (CN)

(72) Inventors: Heping Zhang, Shenzhen (CN); Zhenghao Li, Shenzhen (CN); Zhongying Long, Shenzhen (CN); Dingjie Wang, Shenzhen (CN); Zhaoliang Yang, Shenzhen (CN); Dongxing Tu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/145,331

(22) Filed: Dec. 31, 2013

(65) Prior Publication Data

US 2014/0112422 A1 Apr. 24, 2014

Related U.S. Application Data

(63) Continuation of application No. PCT/CN2012/087959, filed on Dec. 31, 2012.

(30) Foreign Application Priority Data

Apr. 28, 2012 (CN) .......................... 2012 1 0131952

(51) Int. Cl.
*H04B 1/10* (2006.01)
*H04B 7/04* (2006.01)
*H04B 7/08* (2006.01)

(52) U.S. Cl.
CPC ............ *H04B 7/0413* (2013.01); *H04B 7/0404* (2013.01); *H04B 7/0865* (2013.01)
USPC ................. 375/349; 75/316; 75/346

(58) Field of Classification Search
USPC ....................................................... 375/349
See application file for complete search history.

(56) References Cited

U.S. PATENT DOCUMENTS

| 6,088,583 A | 7/2000 | Shimizu et al. |
| 2004/0137857 A1 | 7/2004 | Seo |

(Continued)

FOREIGN PATENT DOCUMENTS

| CN | 1520064 A | 8/2004 |
| CN | 101778444 A | 7/2010 |

(Continued)

OTHER PUBLICATIONS

Foreign Communication From a Counterpart Application, PCT Application No. PCT/CN2012/087959, English Translation of International Search Report dated Apr. 11, 2013, 2 pages.
Foreign Communication From a Counterpart Application, PCT Application No. PCT/CN2012/087959, Written Opinion dated Apr. 11, 2013, 4 pages.
"Part 11: Wireless LAN Medium Access Control (MAC) and Physical Layer (PHY) Specifications," Information Technology—Telecommunications and Information Exchange between Systems—Local and Metropolitan Area Networks, Specific Requirements, ANSI/IEEE Std 802.11, 1999 Edition, 528 pages.

(Continued)

*Primary Examiner* — Erin File
(74) *Attorney, Agent, or Firm* — Conley Rose, P.C.; Grant Rodolph

(57) ABSTRACT

A method and an apparatus are provided for improving a communication rate, which are used in a terminal working in a multiple-input multiple-output (MIMO) state. The method includes: obtaining strength of a first signal received in a first path connected to a first antenna and strength of a second signal received in a second path connected to a second antenna; and adjusting the first path or/and the second path according to a difference between the strength of the first signal and the strength of the second signal, so as to reduce an unbalance degree between the first path and the second path, thereby improving the communication rate. By adopting the present invention, improvement of a rate of an antenna may be achieved by adjusting a balance between the first and second paths.

15 Claims, 8 Drawing Sheets

(56) References Cited

U.S. PATENT DOCUMENTS

| | | |
|---|---|---|
| 2004/0253955 A1 | 12/2004 | Love et al. |
| 2010/0248673 A1* | 9/2010 | Broyde et al. ............. 455/278.1 |
| 2010/0296487 A1* | 11/2010 | Karaoguz et al. ............. 370/332 |
| 2011/0019639 A1* | 1/2011 | Karaoguz et al. ............. 370/331 |
| 2011/0249760 A1* | 10/2011 | Chrisikos et al. ............. 375/259 |
| 2011/0250926 A1* | 10/2011 | Wietfeldt et al. ............. 455/525 |
| 2011/0299618 A1 | 12/2011 | Hammerschmidt et al. |
| 2012/0264388 A1* | 10/2012 | Guo et al. ............. 455/307 |
| 2012/0314649 A1* | 12/2012 | Forenza et al. ............. 370/328 |
| 2013/0215992 A1* | 8/2013 | Kazmi et al. ............. 375/295 |
| 2013/0241793 A1* | 9/2013 | Ai et al. ............. 343/853 |

FOREIGN PATENT DOCUMENTS

| | | | |
|---|---|---|---|
| JP | 2000261351 | A | 9/2000 |
| JP | 2002505543 | A | 2/2002 |
| JP | 20030298674 | A | 10/2003 |
| JP | 2005333640 | A | 12/2005 |
| JP | 2006345500 | A | 12/2006 |
| JP | 2006352576 | A | 12/2006 |
| JP | 2007158423 | A | 6/2007 |
| JP | 2011220346 | A | 11/2011 |
| WO | 9944308 | A1 | 9/1999 |

OTHER PUBLICATIONS

"Part 11: Wireless LAN Medium Access Control (MAC) and Physical Layer (PHY) Specifications, Amendment 5: Enhancements for Higher Throughput," Draft Standard for Information Technology, Telecommunications and Information Exchange between Systems, Local and Metropolitan Area Networks, Specific Requirements, IEEE P802.11n/D6.0, Jul. 2008, 557 pages.

Foreign Communication From a Counterpart Application, Japanese Application No. 2014520528, Japanese Office Action dated Nov. 11, 2014, 5 pages.

Foreign Communication From a Counterpart Application, Japanese Application No. 2014520528, English Translation of Japanese Office Action dated Nov. 11, 2014, 7 pages.

Zhu, L., et al., "Modified MRC Detection Scheme with Spatially Coloured Noise," 7th International Conference on Wireless Communications, Networking and Mobile Computing (WiCOM), Sep. 23-25, 2011, 3 pages.

Foreign Communication From a Counterpart Application, European Application No. 12875120.3, Extended European Search Report dated Oct. 7, 2014, 6 pages.

* cited by examiner

METHOD AND APPARATUS FOR IMPROVING COMMUNICATION RATE

CROSS-REFERENCE TO RELATED APPLICATIONS

This application is a continuation of International Application No. PCT/CN2012/087959, filed on Dec. 31, 2012, which claims priority to Chinese Patent Application No. 201210131952.8, filed on Apr. 28, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of wireless communications, and in particular, to a method and an apparatus for improving a communication rate.

BACKGROUND

With the increasing widespread application of wireless technologies, a multiple-input multiple-output (MIMO) technology is gradually developed. A MIMO system is a core technology applied to the 802.11n. The 802.11n is a brand new wireless local area network technology of the Institute of Electrical and Electronics Engineers (IEEE) after the 802.11b\a\g. At the same time, a dedicated MIMO technology may improve performance of an existing 802.11a/b/g network. The MIMO technology is also currently used in a long term evolution (LTE) technology.

How to maximize a rate of a mobile terminal product in the LTE has always been an important index extremely focused by terminal device manufacturers and operators. When performing a performance comparison, an operator sometimes focuses on a peak rate of a terminal device.

In the prior art, a problem of a peak rate of a terminal device is considered and solved only from the perspective of efficiency of an antenna; however, the foregoing measure is limited, and there is an extremely great difficulty in an adjustment. For example, a rate is improved by optimizing efficiency of first and second antennas; however, great difficulty in debugging work of the antennas exists, and operational space for a terminal product is limited; and when performance of the first antenna is adjusted, another frequency band (that is, not a signal transmission frequency band on which an antenna performance adjustment is currently performed) of the first antenna is also greatly affected, as a result, it is very difficult to achieve a balance among frequency bands.

SUMMARY

A technical problem to be solved by embodiments of the present invention is to provide a method and an apparatus for improving a communication rate, which can implement automatic improvement of the communication rate.

Therefore, in one aspect, an embodiment of the present invention provides a method for improving a communication rate, which is used in a terminal working in a MIMO state, where the method includes: obtaining strength of a first signal received in a first path connected to a first antenna and strength of a second signal received in a second path connected to a second antenna; and adjusting the first path or/and the second path according to a difference between the strength of the first signal and the strength of the second signal, so as to reduce an unbalance degree between the first path and the second path, thereby improving the communication rate.

Furthermore, the method further includes: obtaining a rate of the first signal received in the first path, a rate of the second signal received in the second path, or a signal downlink rate; and adjusting the first path or/and the second path according to a change of the rate of the first signal, the rate of the second signal, or the signal downlink rate, so as to reduce the unbalance degree between the first path and the second path.

The adjusting the first path or/and the second path according to a difference between the strength of the first signal and the strength of the second signal includes: determining whether the difference between the strength of the first signal and the strength of the second signal exceeds a predetermined value; and if a determination result is yes, adjusting an attenuator in the first path or/and a diversity low-noise amplifier in the second path according to a degree of the difference between the strength of the first signal and the strength of the second signal.

The adjusting an attenuator in the first path or/and a diversity low-noise amplifier in the second path according to a degree of the difference between the strength of the first signal and the strength of the second signal includes: when the strength of the first signal is higher than a sum of the strength of the second signal and a preset threshold, and the first signal is a small signal, activating the diversity low-noise amplifier in the second path; when the strength of the first signal is higher than the sum of the strength of the second signal and the preset threshold, and all low-noise amplifiers in the second path are activated, activating the attenuator in the first path, so as to increase signal attenuation in the first path; or when the strength of the first signal is higher than the sum of the strength of the second signal and the preset threshold, and the first signal is a large signal, activating the attenuator in the first path, so as to increase signal attenuation in the first path.

In another aspect, an embodiment of the present invention further provides an apparatus for improving a communication rate, which is used in a terminal working in a MIMO state, where the apparatus includes: an obtaining module configured to obtain strength of a first signal received in a first path connected to a first antenna and strength of a second signal received in a second path connected to a second antenna; and an adjusting module configured to adjust the first path or/and the second path according to a difference between the strength of the first signal and the strength of the second signal, so as to reduce an unbalance degree between the first path and the second path, thereby improving the communication rate.

Furthermore, the obtaining module is further configured to obtain a rate of the first signal received in the first path, a rate of the second signal received in the second path, or a signal downlink rate; and the adjusting module is further configured to adjust the first path or/and the second path according to a change of the rate of the first signal, the rate of the second signal, or the signal downlink rate, so as to reduce the unbalance degree between the first path and the second path.

The adjusting module includes: a determining submodule configured to determine whether the difference between the strength of the first signal and the strength of the second signal exceeds a predetermined value; and a balance adjusting submodule configured to: when a determination result of the determining submodule is yes, adjust an attenuator in the first path or/and a diversity low-noise amplifier in the second path according to a degree of the difference between the strength of the first signal and the strength of the second signal.

The balance adjusting submodule includes: a second path adjusting unit configured to: when the strength of the first signal is higher than a sum of the strength of the second signal and a preset threshold, and the first signal is a small signal, activate the diversity low-noise amplifier in the second path; and a first path adjusting unit configured to: when the strength of the first signal is higher than the sum of the strength of the second signal and the preset threshold, and all low-noise amplifiers in the second path are activated, activate the attenuator in the first path, so as to increase signal attenuation in the first path; or when the strength of the first signal is higher than the sum of the strength of the second signal and the preset threshold, and the first signal is a large signal, activate the attenuator in the first path, so as to increase signal attenuation in the first path.

In another aspect, an embodiment of the present invention further provides a terminal device, where the terminal device works in a MIMO state, and the terminal device includes a first antenna, a second antenna, a first path connected to the first antenna, a second path connected to the second antenna, and a baseband control chip connected to the first path and the second path, where the baseband control chip includes: an obtaining module configured to obtain strength of a first signal received in the first path connected to the first antenna and strength of a second signal received in the second path connected to the second antenna; and an adjusting module configured to adjust the first path or/and the second path according to a difference between the strength of the first signal and the strength of the second signal, so as to reduce an unbalance degree between the first path and the second path, thereby improving the communication rate.

The obtaining module is further configured to obtain a rate of the first signal received in the first path, a rate of the second signal received in the second path, or a signal downlink rate; and the adjusting module is further configured to adjust the first path or/and the second path according to a change of the rate of the first signal, the rate of the second signal, or the signal downlink rate, so as to reduce the unbalance degree between the first path and the second path.

The adjusting module includes: a determining submodule configured to determine whether the difference between the strength of the first signal and the strength of the second signal exceeds a predetermined value; and a balance adjusting submodule configured to: when a determination result of the determining submodule is yes, adjust an attenuator in the first path or/and a diversity low-noise amplifier in the second path according to a degree of the difference between the strength of the first signal and the strength of the second signal.

The balance adjusting submodule includes: a second path adjusting unit configured to: when the strength of the first signal is higher than a sum of the strength of the second signal and a preset threshold, and the first signal is a small signal, activate the diversity low-noise amplifier in the second path; and a first path adjusting unit configured to: when the strength of the first signal is higher than the sum of the strength of the second signal and the preset threshold, and all low-noise amplifiers in the second path are activated, activate the attenuator in the first path, so as to increase signal attenuation in the first path; or when the strength of the first signal is higher than the sum of the strength of the second signal and the preset threshold, and the first signal is a large signal, activate the attenuator in the first path, so as to increase signal attenuation in the first path.

By implementing the embodiments of the present invention, the following beneficial effects are obtained: through a lot of experimental research, the inventor finds that, an unbalance degree of paths affects a throughput rate of the paths to a great extent, and then affects an overall rate of an antenna; and in view of this, a solution for improving a communication rate in a manner of adjusting the unbalance degree of the paths according to signal strength of two paths is proposed, which requires no debugging of the antenna and may also implement automatic improvement of the communication rate.

BRIEF DESCRIPTION OF THE DRAWINGS

To illustrate the technical solutions in the embodiments of the present invention or in the prior art more clearly, the following briefly introduces accompanying drawings required for describing the embodiments or the prior art. The accompanying drawings in the following description merely show some embodiments of the present invention, and persons of ordinary skill in the art may further obtain other drawings according to these accompanying drawings without creative efforts.

DETAILED DESCRIPTION

The technical solutions in the embodiments of the present invention are clearly described in the following with reference to the accompanying drawings in the embodiments of the present invention. The embodiments to be described are merely a part rather than all of the embodiments of the present invention. All other embodiments obtained by persons of ordinary skill in the art based on the embodiments of the present invention without creative efforts shall fall within the protection scope of the present invention.

Before specific embodiments of the present invention are described, a theoretical basis of the technical solutions of the present invention is first illustrated.

Figure 1:
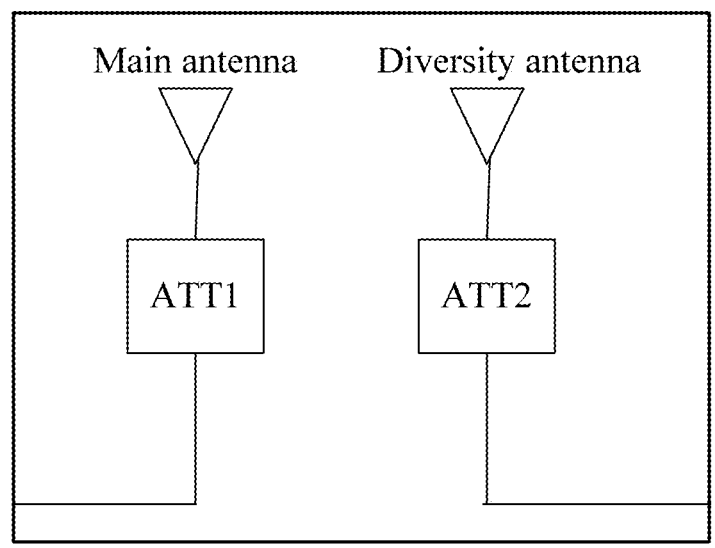
FIG. 1 is a schematic diagram of a MIMO model in an antenna part of a terminal device according to an embodiment of the present invention.

For LTE, good irrelevant transmission for multiple paths and multiple code words is implemented essentially through a MIMO algorithm in coordination with a modulation manner of an orthogonal frequency division multiplexing technology (OFDM) and by using a multipath effect, so as to finally implement a high rate. As shown in FIG. 1, FIG. 1 shows a simple model of an antenna part of a terminal device according to an embodiment of the present invention. An attenuator (ATT) 1/ATT0 may implement functions of an antenna gain and path attenuation. In the embodiments of the present invention, the attenuator may refer to a part simulating the antenna gain and simulating the path attenuation in multiple paths (such as, a first path and a second path).

For a MIMO system shown in FIG. 1, according to research of the inventor, the following matrix may be adopted to describe a signal received by the MIMO system:

$$R = G \times H \times W \times X + n \tag{1}$$

where G represents an unbalance degree of a path, H represents a channel transfer function, W represents a precoding matrix, X is an incoming wave signal, n is thermal noise, and R represents a finally received signal; and the unbalance degree of the path may be represented by using a difference between strength of signals in different paths, and a unit is decibel (dB), that is, an unbalance degree between two paths is 10 times a common logarithm of a ratio between signal strength of the two paths.

Figure 2:
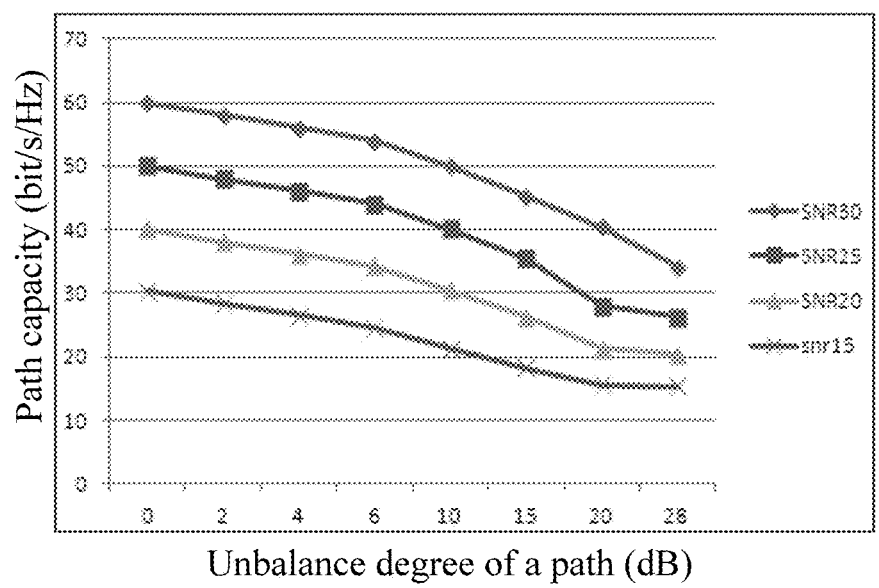
FIG. 2 is a schematic diagram of a relationship between an unbalance degree of a path that is digitalized according to a formula (1) and a path capacity according to an embodiment of the present invention.

When a signal to noise ratio (SNR) of an input signal of an antenna port is greater than 10 dB, a result digitalized according to a formula (1) is shown in FIG. 2. The abscissa is G, that is, an unbalance degree of a path, and a unit is dB, and the ordinate represents a path capacity, and a unit is bit per second per hertz (bit/s/Hz). It can be seen from the figure that, for various SNRs, the higher the unbalance degree of the path is, the smaller the path capacity is.

Figure 3:
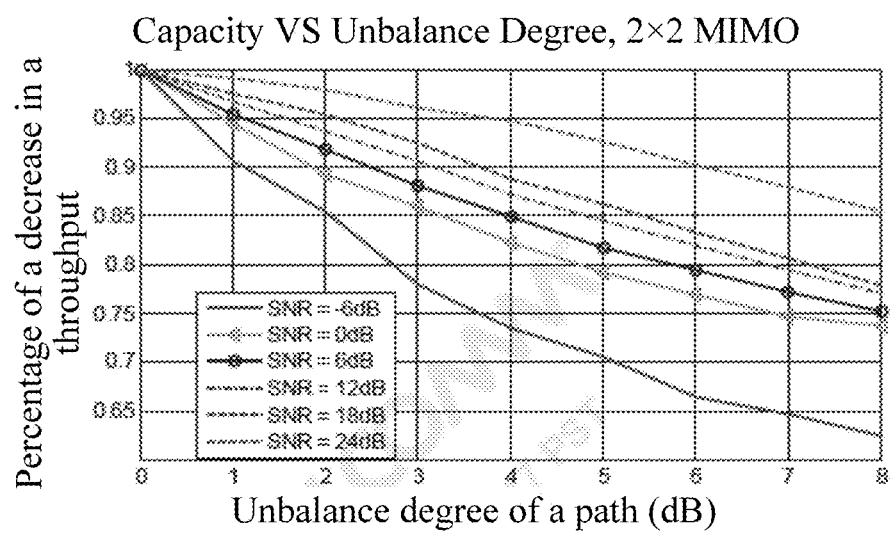
FIG. 3 is a schematic diagram of a channel model simulation of a relationship between an unbalance degree and a percentage of a decrease in a throughput of a path according to an embodiment of the present invention.

Furthermore, as shown in FIG. 3, FIG. 3 shows a result of performing a channel model simulation. It can also be seen that, the higher the unbalance degree of the path is, the smaller a percentage of a decrease in a throughput of the path is, that is, the more the throughput decreases.

To sum up, the inventor finds that, the unbalance degree of the path affects a throughput rate of the path to a great extent, and then affects a communication rate; and according to the foregoing result, in order to obtain a good throughput rate under various signal to noise ratios, an unbalance degree between two paths may be smaller than 3 dB.

Based on the foregoing research, the present invention provides a method for improving a communication rate, so as to achieve improvement of the communication rate by reducing an unbalance degree between paths.

Figure 4:
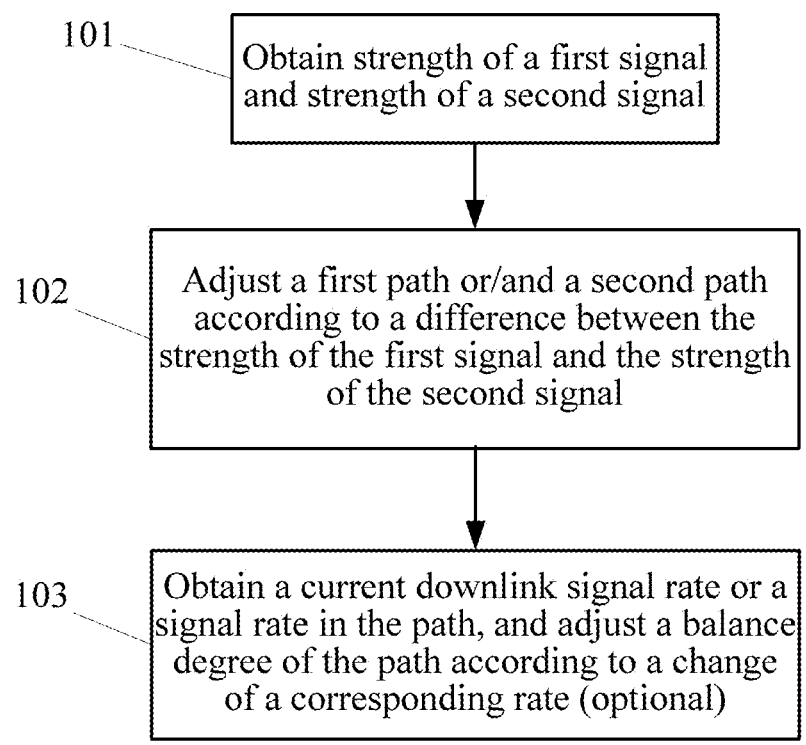
FIG. 4 is a specific schematic flowchart of a method for improving a communication rate according to an embodiment of the present invention.

As shown in FIG. 4, FIG. 4 shows a specific schematic flowchart of a method for improving a communication rate according to an embodiment of the present invention. The method is used in a terminal working in a MIMO state, and includes the following steps.

101: Obtain strength of a first signal received in a first path connected to a first antenna and strength of a second signal received in a second path connected to a second antenna. In this embodiment, strength of a signal refers to power of the signal. The first antenna may be a main antenna, and the second antenna may be a diversity antenna, and vice versa.

102: Adjust the first path or/and the second path according to a difference between the strength of the first signal and the strength of the second signal, so as to reduce an unbalance degree between the first path and the second path, thereby improving the communication rate. When the adjustment is performed, the difference between the strength of the first signal and the strength of the second signal may be represented by a power difference value between the two signals, for example, may be 10 times a common logarithm of a ratio between power of the signals in the two paths, that is, a standard for activating the adjustment may be that the foregoing calculated power difference value is higher than a threshold, where the threshold may be set to a value smaller than or equal to 3 dB.

That is, when an unbalance degree adjustment is performed, a threshold for starting the adjustment may be set, that is, this step is divided into two processes: a. determining whether the difference between the strength of the first signal and the strength of the second signal exceeds a predetermined value; and b. if a determination result is yes, adjusting an attenuator in the first path or/and a diversity low-noise amplifier in the second path according to a degree of the difference between the strength of the first signal and the strength of the second signal, so as to reduce the unbalance degree between the first path and the second path.

Furthermore, during a specific adjustment, in the foregoing step b, the adjustment may be performed in the following manners:

When the strength of the first signal is higher than a sum of the strength of the second signal and a preset threshold, and the first signal is a small signal, the diversity low-noise amplifier in the second path is activated. That is, when signal strength of the first path is small, the unbalance degree between the two paths is reduced in a manner of increasing signal strength of the second path (for example, amplifying the signal in the second path through the low-noise amplifier in the second path).

When the strength of the first signal is higher than the sum of the strength of the second signal and the preset threshold, and all low-noise amplifiers in the second path are activated, the attenuator in the first path is activated, so as to increase signal attenuation in the first path; or when the strength of the first signal is higher than the sum of the strength of the second signal and the preset threshold, and the first signal is a large signal, the attenuator in the first path is activated, so as to increase signal attenuation in the first path.

That is, when the signal strength of the first path is large or the unbalance degree between the two paths cannot be reduced in a manner of amplifying the signal in the second path (for example, when the low-noise amplifiers in the second path are all activated, a size of the signal in the second path cannot be further amplified through a component in the second path), the signal in the first path may be attenuated appropriately to reduce the unbalance degree between the two paths.

In the foregoing adjustment, a standard that "the strength of the first signal is higher than the sum of the strength of the second signal and the preset threshold" may be determined according to an actual situation and experience, for example, the preset threshold may be 3 dB, that is, a difference value between the strength of the first signal and the strength of the second signal exceeds the preset threshold; a small signal may refer to a signal whose signal strength is below −95 dBm (dBm is a unit of signal strength and represents decibel millivolt when strength is represented by using a voltage amplitude of a signal, or decibel milliwatt when strength is represented by using power of a signal); and a large signal may refer to a signal whose signal strength is above −70 dBm.

Certainly, in a specific situation, only one of the attenuator and the low-noise amplifier may be adjusted, or the two may both be adjusted.

In order to obtain a better adjustment effect, a process of performing a path balance adjustment according to a rate may be further included, that is, step 103 of obtaining a current downlink signal rate, and performing a balance degree adjustment of the path according to the downlink signal rate is included, which may specifically be: obtaining a rate of the first signal received in the first path, a rate of the second signal received in the second path, or a signal downlink rate, and adjusting the first path or/and the second path according to a change of the rate of the first signal, the rate of the second signal, or the signal downlink rate, so as to reduce the unbalance degree between the first path and the second path. This step is an optional step.

The signal downlink rate refers to a combined rate of signals passing through the two paths, which reflects an overall downlink rate under the two antennas. The rate of the first signal and the rate of the second signal may be obtained from output ends of the first path and the second path, and the signal downlink rate may be obtained from a subsequently connected network card device. In a specific embodiment, only one of the foregoing rates needs to be obtained. In theory, the rate of the first signal is the same as the rate of the second signal; however, in practice, because of a difference between components in the first path and the second path, the rate of the first signal may be slightly different from the rate of the second signal.

For example, when it is found that the rate decreases, a low-noise amplifier or/and an adjustable attenuator in the two paths may be adjusted; when it is found that the rate rises after the adjustment, it is approved that an adjustment manner is correct and a further adjustment may be performed; or when it is found that the rate decreases after the adjustment, the adjustment manner may be changed or the adjustment may be stopped.

That is to say, when a rate is low (for example, lower than an optimized rate value corresponding to current signal strength, for example, a situation in which an Avr-Throughout value shown in Table 1 is 71) or the rate decreases, same as signal strength detection, the adjustment of the balance degree between main and diversity paths is activated. For a specific method for adjusting the balance degree between the two paths, reference may be made to the foregoing method for performing a path adjustment according to the signal strength (that is, the low-noise amplifier or/and the adjustable attenuator are still adjusted, but the adjustment manner is determined according to a change of the rate before and after the adjustment, and for details, reference may be made to the description in the previous paragraph). For example, when the signal strength is −95 dBm, a system bandwidth is 10 megabytes (Mb), and a maximum downlink rate is 50 megabytes per second (Mbps), when it is detected that a current downlink rate is 40 Mbps, the balance degree adjustment of the path may be activated. Certainly, under different network conditions, a rate condition for activation of the balance degree adjustment of the path may vary, and may be correspondingly set as required.

In the embodiment of the present invention, a rate situation is another triggering condition for activating the adjustment of the balance degree between the main and diversity paths, and the adjustment is a supplement to activate the balance degree adjustment as the signal strength detection.

It can be seen from the foregoing steps that, the foregoing embodiment may be further extended to a situation in which more than two antennas and multiple corresponding paths exist; however, during the adjustment, one or at least two parameters are added, and an adjustment for multiple paths may be implemented only by selecting an appropriate algorithm and extending so that the foregoing method for improving a communication rate according to the embodiment of the present invention is adopted for every two paths, which is not repeatedly described here.

Figure 5:
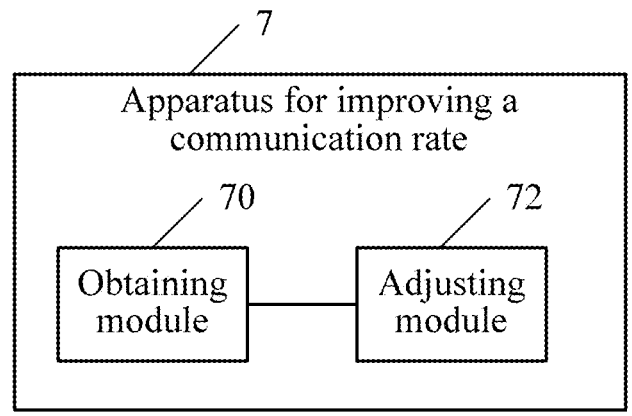
FIG. 5 is a specific schematic composition diagram of an apparatus for improving a communication rate according to an embodiment of the present invention.

Corresponding to the foregoing method embodiment, an embodiment of the present invention further provides an apparatus for improving a communication rate, which is used in a terminal working in a MIMO state. As shown in FIG. 5, the apparatus 7 includes: an obtaining module 70 configured to obtain strength of a first signal received in a first path connected to a first antenna and strength of a second signal received in a second path connected to a second antenna; and an adjusting module 72 configured to adjust the first path or/and the second path according to a difference between the strength of the first signal and the strength of the second signal, so as to reduce an unbalance degree between the first path and the second path, thereby improving the communication rate.

The obtaining module 70 is further configured to obtain a rate of the first signal received in the first path, a rate of the second signal received in the second path, or a signal downlink rate; and the adjusting module 72 is further configured to adjust the first path or/and the second path according to a change of the rate of the first signal, the rate of the second signal, or the signal downlink rate, so as to reduce the unbalance degree between the first path and the second path.

Figure 6:
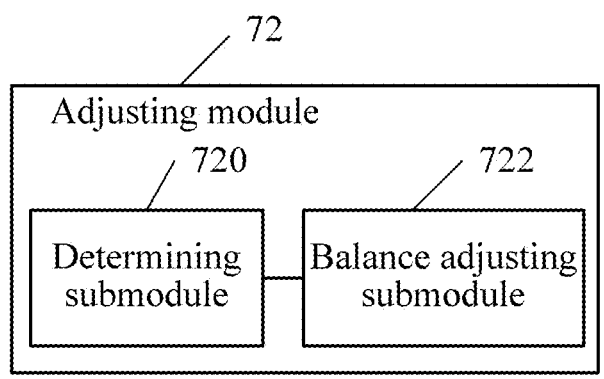
FIG. 6 is a specific schematic composition diagram of an adjusting module according to an embodiment of the present invention.

As shown in FIG. 6, the adjusting module 72 may include: a determining submodule 720 configured to determine whether the difference between the strength of the first signal and the strength of the second signal exceeds a predetermined value; and a balance adjusting submodule 722 configured to: when a determination result of the determining submodule is yes, adjust an attenuator in the first path or/and a diversity low-noise amplifier in the second path according to a degree of the difference between the strength of the first signal and the strength of the second signal.

The balance adjusting submodule 722 may include: a second path adjusting unit configured to: when the strength of the first signal is higher than a sum of the strength of the second signal and a preset threshold, and the first signal is a small signal, activate the diversity low-noise amplifier in the second path; and a first path adjusting unit configured to: when the strength of the first signal is higher than the sum of the strength of the second signal and the preset threshold, and all low-noise amplifiers in the second path are activated, activate the attenuator in the first path, so as to increase signal attenuation in the first path; or when the strength of the first signal is higher than the sum of the strength of the second signal and the preset threshold, and the first signal is a large signal, activate the attenuator in the first path, so as to increase signal attenuation in the first path.

Figure 7:
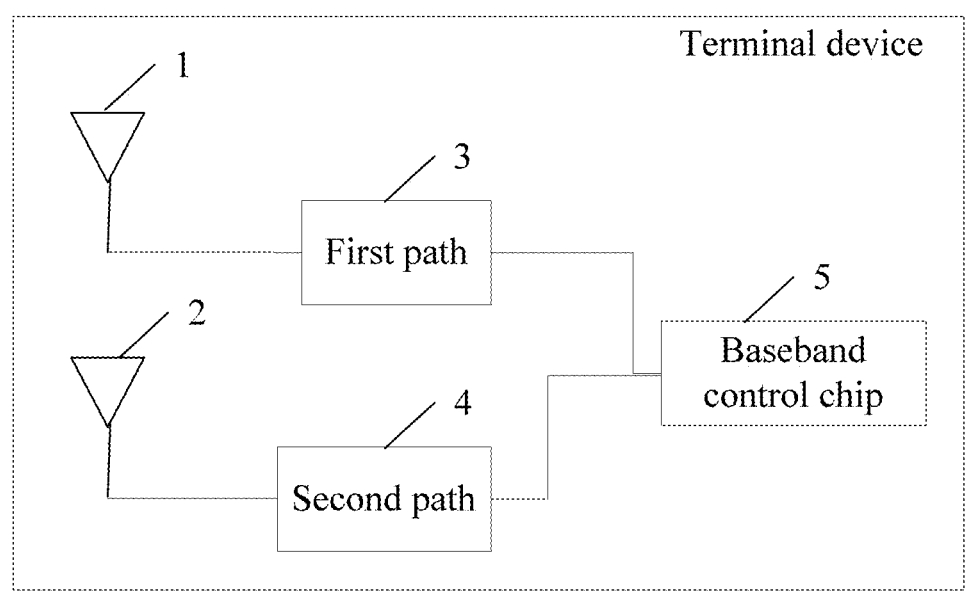
FIG. 7 is a specific schematic composition diagram of a terminal device according to an embodiment of the present invention.

FIG. 7 shows a terminal device including the foregoing apparatus. The terminal device works in a MIMO state, and may specifically be a data card of multicarrier Code Division Multiple Access (CDMA), multicarrier Wideband Code Division Multiple Access (WCDMA), or an LTE standard, or a mobile terminal of another type, or another terminal device supporting a MIMO function. The foregoing terminal device may include: a first antenna 1, a second antenna 2, a first path 3 connected to the first antenna 1, a second path 4 connected to the second antenna 2, and a baseband control chip 5 connected to the first path 3 and the second path 4. The baseband control chip 5 may include the foregoing apparatus 7 for improving a communication rate, and all functions of the apparatus 7 for improving the communication rate are implemented by the baseband control chip 5.

Correspondingly, the baseband control chip 5 may include: an obtaining module configured to obtain strength of a first signal received in the first path connected to the first antenna and strength of a second signal received in the second path connected to the second antenna; and an adjusting module configured to adjust the first path or/and the second path according to a difference between the strength of the first signal and the strength of the second signal, so as to reduce an unbalance degree between the first path and the second path, thereby improving the communication rate.

The obtaining module is further configured to obtain a rate of the first signal received in the first path, a rate of the second signal received in the second path, or a signal downlink rate; and the adjusting module is further configured to adjust the first path or/and the second path according to a change of the rate of the first signal, the rate of the second signal, or the signal downlink rate, so as to reduce the unbalance degree between the first path and the second path.

The adjusting module may include: a determining submodule configured to determine whether the difference between the strength of the first signal and the strength of the second signal exceeds a predetermined value; and a balance adjusting submodule configured to: when a determination result of the determining submodule is yes, adjust an attenuator in the first path or/and a diversity low-noise amplifier in the second path according to a degree of the difference between the strength of the first signal and the strength of the second signal.

The balance adjusting submodule may include: a second path adjusting unit configured to: when the strength of the first signal is higher than a sum of the strength of the second signal and a preset threshold, and the first signal is a small signal, activate the diversity low-noise amplifier in the second path; and a first path adjusting unit configured to: when the strength of the first signal is higher than the sum of the strength of the second signal and the preset threshold, and all low-noise amplifiers in the second path are activated, activate the attenuator in the first path, so as to increase signal attenuation in the first path; or when the strength of the first signal is higher than the sum of the strength of the second signal and the preset threshold, and the first signal is a large signal, activate the attenuator in the first path, so as to increase signal attenuation in the first path.

It can be understood from the foregoing description that, through a lot of experimental research, the inventor finds that, an unbalance degree of paths affects a throughput rate of the paths to a great extent, and then affects a communication rate; and in view of this, a solution for improving a communication rate in a manner of adjusting the unbalance degree of the paths according to signal strength of two paths is proposed, and the balance degree of the paths may also be further adjusted according to a change of a path rate or a downlink rate. In the embodiment of the present invention, it is not required to directly debug an antenna while the communication rate is improved, and an objective of improving the communication rate may be achieved by only adjusting the unbalance degree between the paths.

Figure 8:
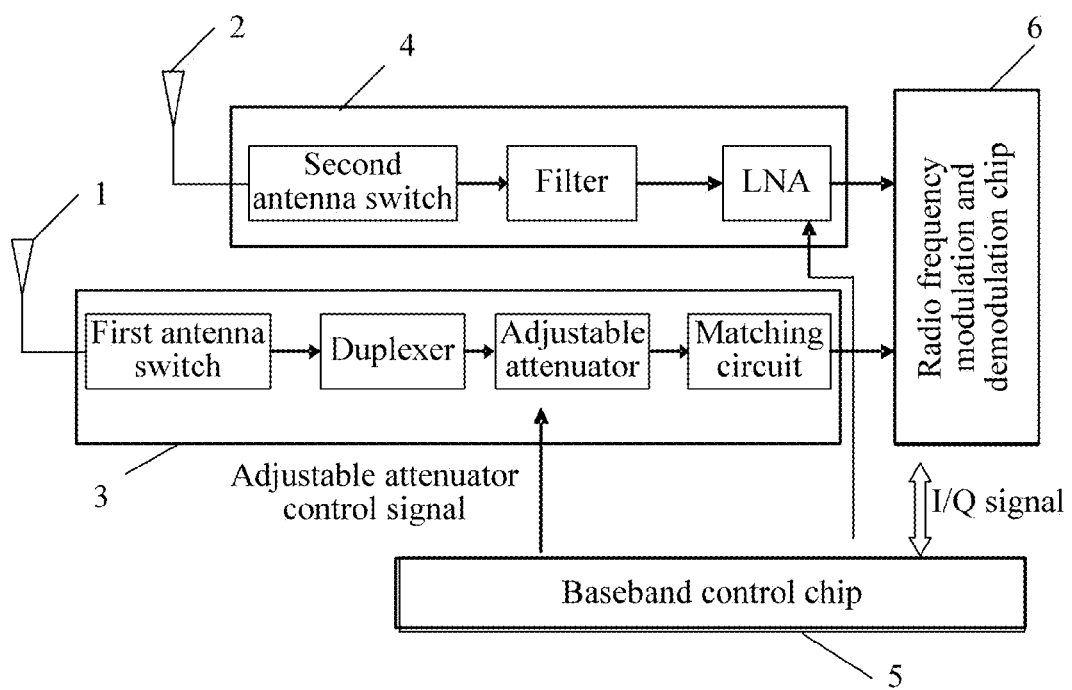
FIG. 8 is another specific schematic composition diagram of a terminal device according to an embodiment of the present invention.

As shown in FIG. 8, FIG. 8 is another specific schematic composition diagram of a terminal device according to an embodiment of the present invention. In this embodiment, a first path 3 includes: a first antenna switch, a duplexer, an adjustable attenuator, a matching circuit; and a second path 4 includes: a second antenna switch, a filter, a low-noise amplifier (LNA). One ends of the first path 3 and the second path 4 are connected to two antennas (a main antenna 1, and a diversity antenna 2, which may be called a secondary antenna 2) respectively, and the other ends are connected to a radio frequency modulation and demodulation chip 6. After obtaining a signal from a path, the radio frequency modulation and demodulation chip 6 performs radio frequency modulation and demodulation and notifies a baseband control chip 5 of signal strength, and the baseband control chip 5 adjusts the adjustable attenuator and/or the LNA in the two paths according to signal strength of the two paths respectively, so as to achieve a balance between the two paths.

Specifically, the baseband control chip may detect radio frequency signal strength of the first and second paths of the current terminal in real time, and dynamically adjust the LNA in the diversity antenna path or the adjustable attenuator in the main antenna path according to a difference between the signal strength of the two paths and a change of a current download rate, so as to achieve a balance between the first and second paths and achieve an optimized communication rate.

Figure 9:
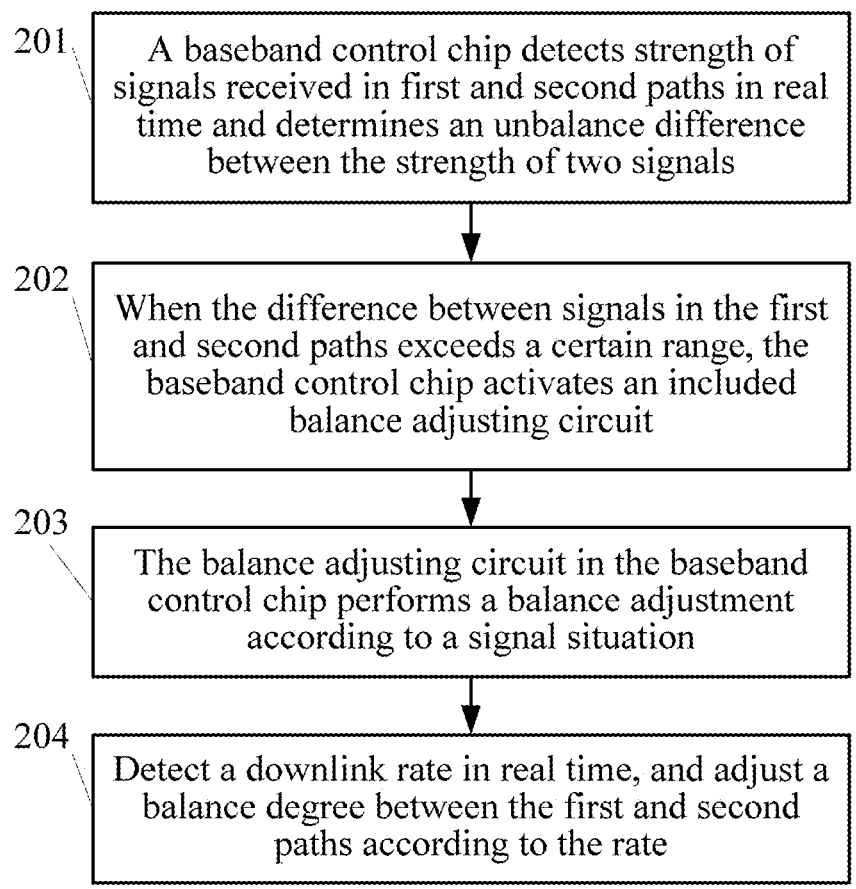
FIG. 9 is another specific schematic flowchart of a method for improving a communication rate according to an embodiment of the present invention.

Corresponding to the situation of the terminal device shown in FIG. 8, an embodiment of the present invention further provides a method for improving a communication rate, which, as shown in FIG. 9, includes:

201: A baseband control chip detects strength of signals received in first and second paths in real time and determines an unbalance difference between the strength of the two signals.

202: When the difference between the signals in the first and second paths exceeds a predetermined threshold, the baseband control chip activates an included balance adjusting circuit to adjust an LNA and/or an attenuator in the two paths.

The predetermined threshold may be a value preset according to an experimental simulation result or experience (for example, the predetermined threshold is 3 dB, that is, the difference between the strength of the signals received in the two paths is set to 3 dB, and the value is set in the baseband control chip), or may also be adjusted as required in a debugging process.

The balance adjusting circuit may be a circuit having functions of the two modules: the obtaining module and the adjusting module in the foregoing apparatus embodiment.

203: The balance adjusting circuit in the baseband control chip performs a balance adjustment according to a signal situation, which specifically is that: when the signal strength of the first path is obviously higher than that of the second path, and the signal in the first path is a small signal, an LNA in a diversity antenna path (that is, the second path) may be activated, and a gain of the LNA and another parameter relevant to an amplifying function of the LNA are determined as required, so as to appropriately amplify the signal in the second path and reduce an unbalance degree between the two paths; or when the signal strength of the first path is obviously higher than that of the second path, and all LNAs work, or when the signal strength of the first path is obviously higher than that of the second path, and the signal in the first path is a large signal, attenuation of the first path may be increased by adjusting an adjustable attenuator in the first path, so as to reduce an unbalance degree between the two paths, for example, the difference between the signal strength is smaller than 3 dB. The foregoing standard of "being obviously higher than" may be that a difference value between the signal strength of the first path and the signal strength of the second path exceeds a predetermined threshold, and the predetermined threshold may be 3 dB.

205: Detect a signal downlink rate or a signal rate of a path in real time, and perform an adjustment of a balance degree between the first and second paths according to the rate, that is, associate the rate to the balance adjustment of the main and diversity paths (corresponding to the first path and the second path respectively). A specific value of the signal downlink rate may be obtained from a subsequently connected network card in real time.

In this step, it may be implemented that a balance degree of a path is further adjusted according to a signal rate of each path or the signal downlink rate, so as to further improve MIMO performance of the entire terminal device. For example, when the rate decreases or is lower than an optimized rate of current signal strength, the low-noise amplifier or/and adjustable attenuator in the two paths are dynamically adjusted.

In the foregoing embodiment, the signal strength of the first and second paths is detected in real time, a comparison is made, and the rate may be further improved by adjusting the balance degree between the two paths according to a rate situation. Specifically, the balance degree between the first and second paths may be improved by adjusting the LNA and the attenuator in the first and second paths. Certainly, in other embodiments of the present invention, the balance degree between the first and second paths may also be improved by separately using the LNA or the attenuator. In addition, the unbalance degree adjustment may be further performed according to a current change of signal rates of the two paths or the signal downlink rate, so as to improve the communication rate.

Table 1 shows results of an experiment performed after the embodiments of the present invention are adopted. In this experiment, main receiving performance is reduced by adjusting matching of a main receiving path, and a difference between reported electrical levels of main and secondary antennas is made to be within 3 dB (wired sensitivity of the main antenna is adjusted from −97 dBm to about −94 dBm), so that the antenna is in a MIMO working state. A chip improves a throughput rate by adopting a MIMO algorithm, so as to reach a level of a theoretical peak rate of 71 Mbps under a strong signal.

Table 1 and Table 2 show rate situations under strong, moderate, and weak signals at four angles on a horizontal plane in a small network (which is set up in a laboratory environment, and is similar to a wireless communication network environment in a daily life use scenario, that is, a small wireless network environment) before and after the unbalance degree adjustment is performed according to the method in the embodiment of the present invention, and it can be found that, the result conforms to the foregoing theoretical situation. Table 1 shows a rate situation before the adjustment, and Table 2 shows a rate situation after the unbalance degree adjustment is performed according to the method in the embodiment of the present invention. In Table 1 and Table 2, RSRP-0 refers to a reported signal strength situation of the first path, RSRP-1 refers to a reported signal strength situation of the second path, and Avr-Throughout refers to a wireless download rate under the signal strength.

TABLE 1

| Direction (downlink) | Signal strength | RSRP-0 | RSRP-1 | Avr-Throughout |
|---|---|---|---|---|
| 3 o'clock | Strong | −73 | −81 | 71 |
| | Moderate | −94 | −100 | 54 |
| | Weak | −104 | −110 | 20 |
| | Extremely weak | −110 | −118 | 11 |
| 6 o'clock | Strong | −74 | −80 | 71 |
| | Moderate | −94 | −101 | 45 |
| | Weak | −105 | −110 | 20 |
| | Extremely weak | −109 | −115 | 11 |

TABLE 1-continued

| Direction (downlink) | Signal strength | RSRP-0 | RSRP-1 | Avr-Throughout |
|---|---|---|---|---|
| 9 o'clock | Strong | −75 | −82 | 71 |
| | Moderate | −95 | −100 | 51 |
| | Weak | −105 | −102 | 24 |
| | Extremely weak | −110 | −116 | 14 |
| 12 o'clock | Strong | −74 | −79 | 71 |
| | Moderate | −94 | −99 | 55 |
| | Weak | −104 | −110 | 22 |
| | Extremely weak | −110 | −117 | 10 |

TABLE 2

| Direction (downlink) | Signal strength | RSRP-0 | RSRP-1 | Avr-Throughout |
|---|---|---|---|---|
| 3 o'clock | Strong | −73 | −75 | 71 |
| | Moderate | −94 | −95 | 60 |
| | Weak | −104 | −105 | 30 |
| | Extremely weak | −110 | −112 | 18 |
| 6 o'clock | Strong | −74 | −75 | 71 |
| | Moderate | −94 | −95 | 53 |
| | Weak | −105 | −106 | 26 |
| | Extremely weak | −109 | −110 | 19 |
| 9 o'clock | Strong | −75 | −75 | 71 |
| | Moderate | −95 | −96 | 61 |
| | Weak | −105 | −105 | 31 |
| | Extremely weak | −110 | −110 | 21 |
| 12 o'clock | Strong | −74 | −76 | 71 |
| | Moderate | −94 | −96 | 61 |
| | Weak | −104 | −107 | 29 |
| | Extremely weak | −110 | −112 | 15 |

It can be found from data in Table 1 and Table 2 that, in a situation in which the signal strength is moderate/weak, the wireless download rate in Table 1 is lower than a corresponding rate in Table 2. That is, when the solutions in the embodiments of the present invention are adopted to make the first path and the second path achieve a signal balance, it obviously helps to improve rates of moderate and weak signals.

Persons of ordinary skill in the art should understand that all or a part of the processes of the methods in the foregoing embodiments may be implemented by a computer program instructing relevant hardware. The program may be stored in a readable storage medium of a computer. When the program runs, the processes of the methods in the foregoing embodiments are performed. The storage medium may be a magnetic disk, an optical disk, a read-only memory (ROM), a random access memory (RAM), or the like.

The foregoing disclosures are merely exemplary embodiments of the present invention, but are not intended to limit the scope of rights of the present invention. Any equivalent modification made according to the claims of the present invention still falls within the scope of the present invention.

What is claimed is:

1. A method for improving a communication rate, used in a terminal working in a multiple-input multiple-output (MIMO) state, the method comprising:
    obtaining a strength of a first signal received in a first path connected to a first antenna and a strength of a second signal received in a second path connected to a second antenna;
    adjusting at least one of the first path and the second path according to a difference between the strength of the first signal and the strength of the second signal to reduce an unbalance degree between the first path and the second path;

obtaining a rate of the first signal received in the first path, a rate of the second signal received in the second path, or a signal downlink rate; and adjusting at least one of the first path and the second path according to a change of the rate of the first signal, the rate of the second signal, or the signal downlink rate to reduce the unbalance degree between the first path and the second path.

2. The method according to claim 1, wherein adjusting at least one of the first path and the second path according to the difference between the strength of the first signal and the strength of the second signal comprises:

determining whether the difference between the strength of the first signal and the strength of the second signal exceeds a predetermined value; and adjusting an attenuator in at least one of the first path and a diversity low-noise amplifier in the second path according to a degree of the difference between the strength of the first signal and the strength of the second signal when a determination result is that the difference between the strength of the first signal and the strength of the second signal exceeds the predetermined value.

3. The method according to claim 2, wherein adjusting at least one of the attenuator in the first path and the diversity low-noise amplifier in the second path according to the degree of the difference between the strength of the first signal and the strength of the second signal comprises:

activating the diversity low-noise amplifier in the second path when the strength of the first signal is higher than a sum of the strength of the second signal and a preset threshold and when the first signal is a small signal;

activating the attenuator in the first path to increase signal attenuation in the first path when the strength of the first signal is higher than the sum of the strength of the second signal and the preset threshold and when all low-noise amplifiers in the second path are activated; or activating the attenuator in the first path to increase signal attenuation in the first path when the strength of the first signal is higher than the sum of the strength of the second signal and the preset threshold and when the first signal is a large signal.

4. A method for improving a communication rate, used in a terminal working in a multiple-input multiple-output (MIMO) state, the method comprising:

obtaining a strength of a first signal received in a first path connected to a first antenna and a strength of a second signal received in a second path connected to a second antenna; and adjusting at least one of the first path and the second path according to a difference between the strength of the first signal and the strength of the second signal to reduce an unbalance degree between the first path and the second path, wherein adjusting at least one of the first path and the second path according to the difference between the strength of the first signal and the strength of the second signal comprises:

determining whether the difference between the strength of the first signal and the strength of the second signal exceeds a predetermined value; and adjusting at least one of an attenuator in the first path and a diversity low-noise amplifier in the second path according to a degree of the difference between the strength of the first signal and the strength of the second signal when a determination result is that the difference between the strength of the first signal and the strength of the second signal exceeds the predetermined value.

5. The method according to claim 4, wherein adjusting the attenuator in at least one of the first path and the diversity low-noise amplifier in the second path according to the degree of the difference between the strength of the first signal and the strength of the second signal comprises:

activating the diversity low-noise amplifier in the second path when the strength of the first signal is higher than a sum of the strength of the second signal and a preset threshold and when the first signal is a small signal;

activating the attenuator in the first path to increase signal attenuation in the first path when the strength of the first signal is higher than the sum of the strength of the second signal and the preset threshold and when all low-noise amplifiers in the second path are activated; or activating the attenuator in the first path to increase signal attenuation in the first path when the strength of the first signal is higher than the sum of the strength of the second signal and the preset threshold and when the first signal is a large signal.

6. An apparatus for improving a communication rate, used in a terminal working in a multiple-input multiple-output (MIMO) state, the apparatus comprising:

an obtaining module configured to obtain a strength of a first signal received in a first path connected to a first antenna and a strength of a second signal received in a second path connected to a second antenna; and an adjusting module configured to adjust at least one of the first path and the second path according to a difference between the strength of the first signal and the strength of the second signal to reduce an unbalance degree between the first path and the second path, wherein the obtaining module is further configured to:
obtain a rate of the first signal received in the first path, a rate of the second signal received in the second path, or a signal downlink rate; and adjust at least one of the first path and the second path according to a change of the rate of the first signal, the rate of the second signal, and the signal downlink rate to reduce the unbalance degree between the first path and the second path.

7. The apparatus according to claim 6, wherein the adjusting module comprises:

a determining submodule configured to determine whether the difference between the strength of the first signal and the strength of the second signal exceeds a predetermined value; and a balance adjusting submodule configured to adjust at least one of an attenuator in the first path and a diversity low-noise amplifier in the second path according to a degree of the difference between the strength of the first signal and the strength of the second signal when the difference between the strength of the first signal and the strength of the second signal exceeds the predetermined value.

8. The apparatus according to claim 7, wherein the balance adjusting submodule comprises:

a second path adjusting unit configured to activate the diversity low-noise amplifier in the second path when the strength of the first signal is higher than a sum of the strength of the second signal and a preset threshold and when the first signal is a small signal; and a first path adjusting unit configured to:
activate the attenuator in the first path to increase signal attenuation in the first path when the strength of the first signal is higher than the sum of the strength of the second signal and the preset threshold and when all low-noise amplifiers in the second path are activated; or activate the attenuator in the first path to increase signal attenuation in the first path when the strength of the first signal is higher than the sum of the strength of the second signal and the preset threshold and when the first signal is a large signal.

9. An apparatus for improving a communication rate, used in a terminal working in a multiple-input multiple-output (MIMO) state, the apparatus comprising:

an obtaining module configured to obtain a strength of a first signal received in a first path connected to a first antenna and a strength of a second signal received in a second path connected to a second antenna; and an adjusting module configured to adjust at least one of the first path and the second path according to a difference between the strength of the first signal and the strength of the second signal to reduce an unbalance degree between the first path and the second path, wherein the adjusting module comprises:

a determining submodule configured to determine whether the difference between the strength of the first signal and the strength of the second signal exceeds a predetermined value; and a balance adjusting submodule configured to adjust at least one of an attenuator in the first path and a diversity low-noise amplifier in the second path according to a degree of the difference between the strength of the first signal and the strength of the second signal when the difference between the strength of the first signal and the strength of the second signal exceeds the predetermined value.

10. The apparatus according to claim 9, wherein the balance adjusting submodule comprises:

a second path adjusting unit configured to activate the diversity low-noise amplifier in the second path when the strength of the first signal is higher than a sum of the strength of the second signal and a preset threshold and when the first signal is a small signal; and a first path adjusting unit configured to:

activate the attenuator in the first path to increase signal attenuation in the first path when the strength of the first signal is higher than the sum of the strength of the second signal and the preset threshold and when all low-noise amplifiers in the second path are activated; or activate the attenuator in the first path to increase signal attenuation in the first path when the strength of the first signal is higher than the sum of the strength of the second signal and the preset threshold and when the first signal is a large signal.

11. A terminal device, working in a multiple-input multiple-output (MIMO) state, the terminal device comprising:
a first antenna;
a second antenna;
a first path connected to the first antenna;
a second path connected to the second antenna; and
a baseband control chip connected to the first path and the second path, wherein the baseband control chip comprises:

an obtaining module configured to obtain a strength of a first signal received in the first path connected to the first antenna and a strength of a second signal received in the second path connected to the second antenna; and an adjusting module configured to adjust at least one of the first path and the second path according to a difference between the strength of the first signal and the strength of the second signal to reduce an unbalance degree between the first path and the second path, wherein the obtaining module is further configured to obtain a rate of the first signal received in the first path, a rate of the second signal received in the second path, or a signal downlink rate, and wherein the adjusting module is further configured to adjust at least one of the first path and the second path according to a change of the rate of the first signal, the rate of the second signal, and the signal downlink rate to reduce the unbalance degree between the first path and the second path.

12. The terminal device according to claim 11, wherein the adjusting module comprises:

a determining submodule configured to determine whether the difference between the strength of the first signal and the strength of the second signal exceeds a predetermined value; and a balance adjusting submodule configured to adjust at least one of an attenuator in the first path and a diversity low-noise amplifier in the second path according to a degree of the difference between the strength of the first signal and the strength of the second signal when a determination result of the determining submodule is that the difference between the strength of the first signal and the strength of the second signal exceeds the predetermined value.

13. The terminal device according to claim 12, wherein the balance adjusting submodule comprises:

a second path adjusting unit configured to activate the diversity low-noise amplifier in the second path when the strength of the first signal is higher than a sum of the strength of the second signal and a preset threshold and when the first signal is a small signal; and a first path adjusting unit configured to:

activate the attenuator in the first path to increase signal attenuation in the first path when the strength of the first signal is higher than the sum of the strength of the second signal and the preset threshold, and when all low-noise amplifiers in the second path are activated; or activate the attenuator in the first path to increase signal attenuation in the first path when the strength of the first signal is higher than the sum of the strength of the second signal and the preset threshold, and when the first signal is a large signal.

14. A terminal device, working in a multiple-input multiple-output (MIMO) state, the terminal device comprising:
a first antenna;
a second antenna;
a first path connected to the first antenna;
a second path connected to the second antenna; and
a baseband control chip connected to the first path and the second path, wherein the baseband control chip comprises:

an obtaining module configured to obtain a strength of a first signal received in the first path connected to the first antenna and a strength of a second signal received in the second path connected to the second antenna; and an adjusting module configured to adjust at least one of the first path and the second path according to a difference between the strength of the first signal and the strength of the second signal to reduce an unbalance degree between the first path and the second path, wherein the adjusting module comprises:
  a determining submodule configured to determine whether the difference between the strength of the first signal and the strength of the second signal exceeds a predetermined value; and
  a balance adjusting submodule configured to adjust at least one of an attenuator in the first path and a diversity low-noise amplifier in the second path according to a degree of the difference between the strength of the first signal and the strength of the second signal when the difference between the strength of the first signal and the strength of the second signal exceeds the predetermined value.

15. The terminal device according to claim 14, wherein the balance adjusting submodule comprises:
  a second path adjusting unit configured to activate the diversity low-noise amplifier in the second path when the strength of the first signal is higher than a sum of the strength of the second signal and a preset threshold and when the first signal is a small signal; and
  a first path adjusting unit configured to:
    activate the attenuator in the first path to increase signal attenuation in the first path when the strength of the first signal is higher than the sum of the strength of the second signal and the preset threshold and when all low-noise amplifiers in the second path are activated; or
    activate the attenuator in the first path to increase signal attenuation in the first path when the strength of the first signal is higher than the sum of the strength of the second signal and the preset threshold and when the first signal is a large signal.

* * * * *